(12) United States Patent
Divecha et al.

(10) Patent No.: US 6,378,309 B1
(45) Date of Patent: Apr. 30, 2002

(54) SINGLE AIR INLET

(75) Inventors: Devang D. Divecha, Lafayette, IN (US); James D. Peltier, Altenholz (DE)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/740,547

(22) Filed: Dec. 19, 2000

(51) Int. Cl.$^7$ ................................................ F02B 33/44
(52) U.S. Cl. ..................... 60/612; 123/562; 415/170 A; 415/98
(58) Field of Search .................. 60/612; 123/562; 415/170 A, 98, 97, 93

(56) References Cited

U.S. PATENT DOCUMENTS

| | | | | |
|---|---|---|---|---|
| 2,359,615 A | * | 10/1944 | Browne et al. | 60/612 |
| 3,457,869 A | * | 7/1969 | Janetz | 415/98 |
| 3,826,589 A | * | 7/1974 | Frank et al. | 415/170 A |
| 5,142,867 A | * | 9/1992 | Bergmann et al. | 60/612 |
| 5,845,495 A | * | 12/1998 | Schray et al. | 60/612 |
| 6,205,787 B1 | * | 3/2001 | Woollenweber et al. | 60/612 |

FOREIGN PATENT DOCUMENTS

| | | | | |
|---|---|---|---|---|
| JP | 355054633 A | * | 4/1980 | 60/612 |

* cited by examiner

Primary Examiner—Thomas Denion
Assistant Examiner—Thai-Ba Trieu
(74) Attorney, Agent, or Firm—Fred J. Baehr; Larry G. Cain

(57) ABSTRACT

A single air inlet for a pair of turbochargers has a duct portion with a circular inlet, a converging bifurcated portion having a pair of circular outlets, which are in fluid communication with inlet portions of compressor portions of the turbochargers and evenly distribute the incoming air to the compressor inlet portions, a baffle disposed in the bifurcated portion separating the outlet portions to prevent pulses generated in one compressor portion from affecting the other compressor portion and an elbow portion that registers with the circular inlet.

12 Claims, 2 Drawing Sheets

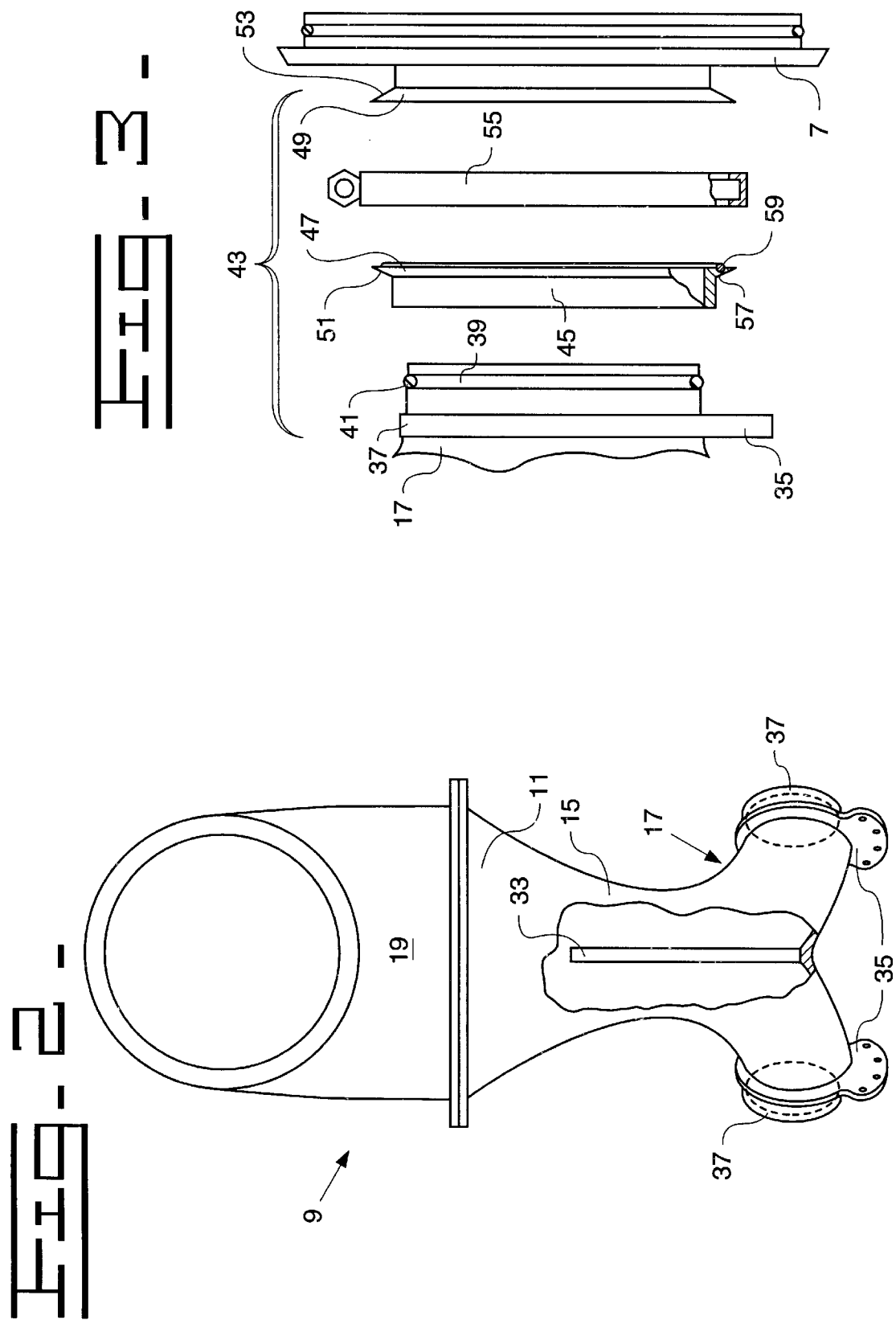

SINGLE AIR INLET

TECHNICAL FIELD

The invention relates to an internal combustion engine having a pair of parallel turbochargers and more particularly to a single combustion air inlet for the pair of turbochargers.

BACKGROUND ART

Pairs of axial flow turbochargers were mounted side by side and while not connected their axes were aligned and had separate air inlets and a single exhaust outlet. This arrangement was not suitable for radial flow turbochargers, because it took up more space and the piping produced greater pressure drops, which reduced efficiency.

DISCLOSURE OF THE INVENTION

In general, a single air inlet for a pair of parallel turbochargers each having a turbine portion and a compressor portion and each compressor portion having an air inlet portion, when made in accordance with this invention, comprises a duct portion having a single circular inlet portion and a converging bifurcated portion having a pair of circular outlet portions. The circular outlet portions register with an inlet portion on each of the compressor portions and distribute the air evenly to the compressor inlet portions. A baffle is disposed in the bifurcated portion to separate the circular outlet portions and prevent pulses generated in one compressor portion affecting the other compressor portion.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

FIG. 2 is a partial sectional view of the single air inlet; and

FIG. 3 is an enlarged exploded view of a connection between the single air inlet and an inlet portion of a compressor portion of the turbocharger.

BEST MODE FOR CARRYING OUT THE INVENTION

Figure 1:
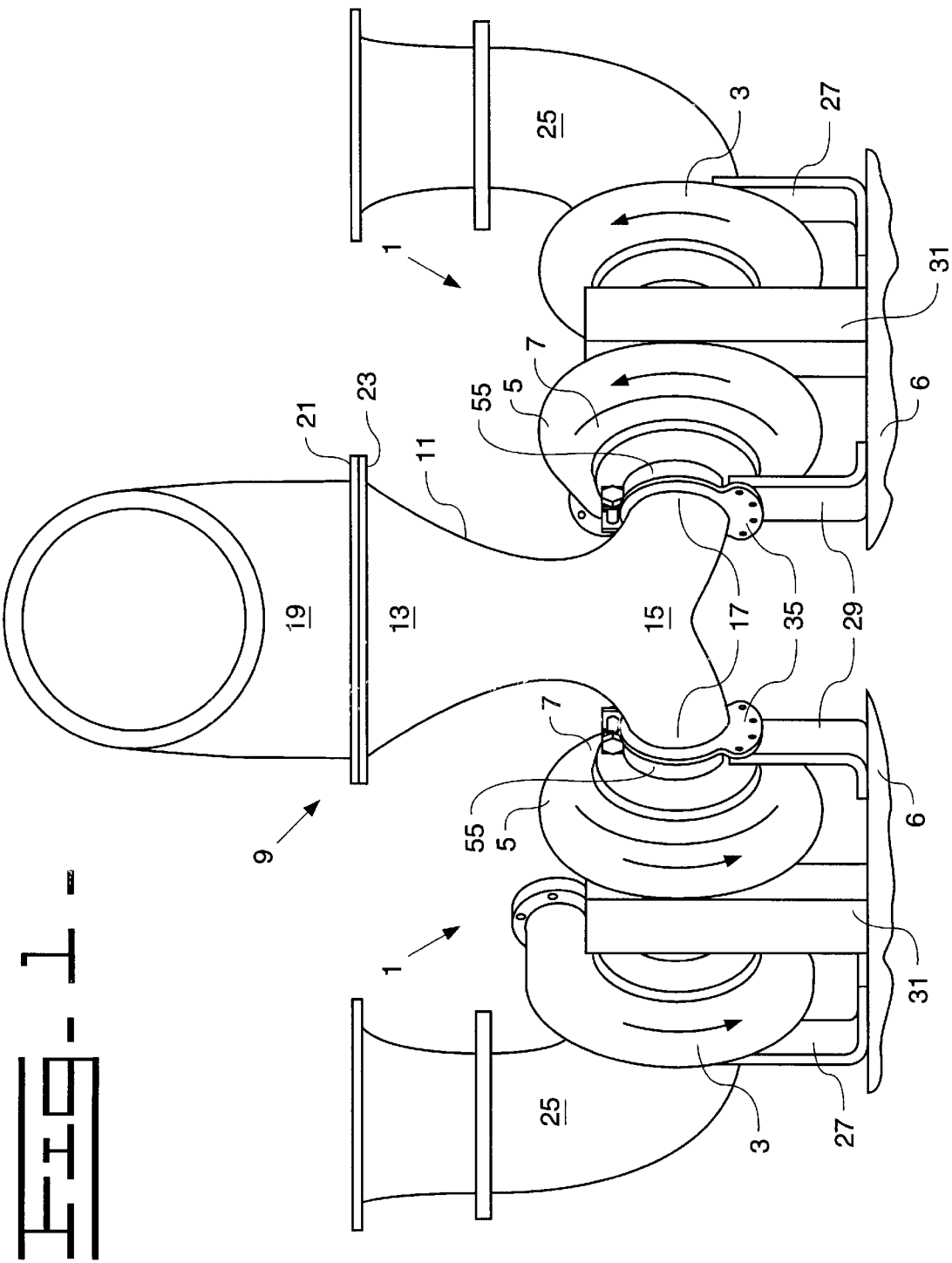
FIG. 1 is an elevational view of a single air inlet for a pair of turbochargers.

Referring now to the drawings in detail and in particular to FIG. 1, there is shown a pair of turbochargers 1 each having a turbine portion 3 and a compressor portion 5. The turbochargers 1 are disposed in parallel and each rotate in a different direction. The turbochargers 1 supply combustion air to an internal combustion engine 6 of which only a very small portion is shown. The compressor portions 5 each have an air inlet portion 7 disposed in fluid communication with a single air inlet 9. The single air inlet 9 comprises a duct portion 11 having a single large circular inlet portion 13, which converges into a bifurcated portion 15 having a pair of smaller circular outlet portions 17 that register with the inlet portion 7 on each of the compressor portions 5. An elbow portion 19 registers with the large circular inlet portion 7 and generally turns the influent air 90°. The converging bifurcated portion 15 cooperates with the smaller circular outlet portions 17 to evenly distribute the incoming combustion air over the entire inlet compressor portions 7 to reduce repeated stressing on the compressor wheels resulting from uneven inlet flow distribution. Flanges 21 and 23, respectively, connect the elbow portion 19 to the circular inlet portion 13. A separate exhaust duct 25 (only a portion thereof is shown) directs the exhaust gasses from each turbine portions 3 to the atmosphere. The turbochargers 1, the single air inlet 9, and the exhaust ducts 25 are mounted on the engine 6 by the mounting brackets 27, 29 and 31.

FIG. 2 shows the single air inlet 9 has a baffle 33 separating the circular outlet portions 17 to prevent pulses generated in one of the compressor portions 5 from affecting the other compressor portion 5. A support 35 is attached to each of the circular outlet portions 17 by welding or other means. The supports 35 are attached to the mounting brackets 29 by bolts or other means. The circular outlet portions 17 outside of the supports 35 forms a cylindrical portion 37 and each cylindrical portion 37 has an axis which when extended join forming an angle greater than 90° and less than 180°. The preferred included angle is 120° as at this angle the piping arrangement and pressure drops are optimized. An outer circumferential groove 39 is disposed in the cylindrical portions 37 outside of the supports 35 for receiving an O-ring 41.

FIG. 3 shows a sliding seal and quick coupling 43 that is disposed between the compressor inlet portion 7 and the cylindrical portion 37. The sliding seal and quick coupling 43 comprise a cylindrical collar 45 connected to the compressor inlet portion 7 and slidably disposed over the cylindrical portion 37 and the O-ring 41 disposed therebetween in the groove 39 in the cylindrical portion 37. The cylindrical collar 45 has a flange 47, which mates with a flange 49 on the compressor inlet portion 7. The flanges 47 and 49 each have a back surface 51 and 53, respectively, angled toward the mating surfaces. A split ring 55 has a U-shaped cross section fitting over the mating flanges 47 and 49. The split ring 55 cooperates with the angled surfaces 51 and 53 to pull the mating flanges 47 and 49 together and form a seal therewith. To provide a more resilient seal, a circumferential groove 55 may be disposed in the mating face of the flange 51 for receiving an O-ring 57. The single air inlet 9 can be disconnected from the compressor portions 5 by removing the split rings 55 to facilitate servicing of the turbocharger 1.

While the preferred embodiments described herein set forth the best mode to practice this invention presently contemplated by the inventors, numerous modifications and adaptations of this invention will be apparent to others of ordinary skill in the art. Therefore, the embodiments are to be considered as illustrative and exemplary and it is understood that the claims are intended to cover such modifications and adaptations as they are considered to be within the spirit and scope of this invention.

INDUSTRIAL APPLICABILITY

A single air inlet, when made in accordance with this invention, advantageously reduces pressure drop in the inlet and exhaust ducts and reduces space requirements. It also distributes influent air evenly to the inlet of the compressor wheel and the baffle prevents pulses from being transmitted from one compressor to the other, either of which could cause failure of compressor wheels due to fatigue. It also makes assembly and disassembly easier, reducing installation and maintenance cost.

We claim:

1. A single air inlet for a pair of parallel turbochargers each having a turbine portion and a compressor potion, each compressor portion having an air inlet portion, the single air inlet comprising a duct portion having a single circular inlet portion converging into a bifurcated portion having a pair of circular outlet portions that register with an inlet portion on each of the compressor portions to distribute inlet air evenly across the inlet portions of the compressors and a baffle disposed in the converging inlet portion adjacent the bifurcated portion to provide greater separation between the circular outlet portions and prevent pulses generated in one compressor portion affecting the other compressor portion.

2. The single air inlet as set forth in claim 1, wherein each of the circular outlet portions comprises a cylindrical portion.

3. The single air inlet as set forth in claim 2, wherein each of the cylindrical outlet portions has an axis, which when extended join, forming an angle greater than 90° and less than 180°.

4. The single air inlet as set forth in claim 3, comprising an elbow portion registering with the circular inlet portion.

5. The single air inlet as set forth in claim 4, comprising a cylindrical collar connected to each of the compressor inlet portions and slidably disposed over each of the cylindrical outlet portions and an O-ring disposed therebetween in a circumferential groove forming a sliding seal between each cylindrical collar and cylindrical outlet portion.

6. The single air inlet as set forth in claim 5, comprising a flange disposed on one end of each cylindrical collar and a mating flange disposed on each compressor inlet portion.

7. The single air inlet as set forth in claim 6, wherein the mating flanges each have a back surface angled toward the mating surfaces and a split ring having a U-shaped cross section fitting over the mating flanges, the split ring cooperating with the angled surfaces to form a seal between the mating flanges.

8. The single air inlet as set forth in claim 2, comprising an elbow portion registering with the circular inlet portion.

9. The single air inlet, as set forth in claim 8, comprising a cylindrical collar connected to each of the compressor inlet portions and slidably disposed over each of the cylindrical outlet portions and an O-ring disposed therebetween in a circumferential groove forming a sliding seal between each cylindrical collar and cylindrical outlet portion.

10. The single air inlet as set forth in claim 9, comprising a flange disposed on one end of each cylindrical collar and a mating flange disposed on each compressor inlet portion.

11. The single air inlet as set forth in claim 10, wherein the mating flanges each have a back surface angled toward the mating surfaces and a split ring having a U-shaped cross section fitting over the mating flanges, the split ring cooperating with the angled surfaces to form a seal between the mating flanges.

12. The single air inlet as set forth in claim 8, wherein each of the cylindrical outlet portions has an axis, which when extended join, forming an angle of 120°.

* * * * *